United States Patent
Iwaskai et al.

(10) Patent No.: US 6,421,369 B1
(45) Date of Patent: Jul. 16, 2002

(54) RECEIVING METHOD AND RECEIVER FOR SPREAD SPECTRUM SIGNAL

(75) Inventors: Jun Iwaskai; Katsuya Yamamoto, both of Tokyo; Nobuhiko Watanabe, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/264,405

(22) Filed: Mar. 8, 1999

(30) Foreign Application Priority Data

Mar. 10, 1998 (JP) .......................................... 10-058137

(51) Int. Cl.$^7$ .............................................. H04B 15/00
(52) U.S. Cl. ...................................................... 375/130
(58) Field of Search .................................. 375/130, 142, 375/136, 150; 370/335, 342, 320, 441

(56) References Cited

U.S. PATENT DOCUMENTS 5,596,599 A * 1/1997 Saito ........................... 375/200
5,793,794 A * 8/1998 Kato et al. .................. 375/200
5,970,392 A * 10/1999 Hatae .......................... 455/66
6,047,018 A * 4/2000 Emi ............................ 375/202

* cited by examiner

*Primary Examiner*—Chi Pham
*Assistant Examiner*—Emmanuel Bayard
(74) *Attorney, Agent, or Firm*—Jay H. Maioli

(57) ABSTRACT

In a receiving method and receiver for spread spectrum signals, a predetermined detection phase range is set as a reference phase position with a receiving timing of a spectrum signal having the highest correlation value with a diffusion code among a plurality of spread spectrum signals received, spread spectrum signals of which the correlation values with the diffusion codes are a predetermined level or more are detected from the spread spectrum signals within the predetermined detection phase range, a demodulation signal is generated from the spread spectrum signals, of which the correlation values are at least at the predetermined level. Then, the steps of setting the predetermined detection phase range, detecting the spread spectrum signals, and generating the modulation signal are repeated. If the spread spectrum signal, of which the correlation values with the diffusion codes are at least at the predetermined, level, can not be detected within the predetermined detection phase range, the detection phase range is widened based on the reference phase position.

10 Claims, 9 Drawing Sheets

RECEIVING METHOD AND RECEIVER FOR SPREAD SPECTRUM SIGNAL

BACKGROUND OF THE INVENTION

1. Field of the Invention

The present invention relates to a receiver and receiving method for spread spectrum signals, and more particularly, is preferably applied to a radio communication system such as a portable telephone system.

2. Description of the Related Art

In a cellular radio communication system, an area of providing a communication service is divided into cells of desired size and every base station serving as a fixed radio station is installed in a cell. A portable telephone as a mobile radio station radio-communicates with the base station in the cell in which the portable telephone itself is located.

There have been proposed various kinds of systems as a communication system between the portable telephone and the base station. One of the systems is a code division multiple access (CDMA) system.

In The CDMA system, a pseudo noise sequence (PN) code having a characteristic pattern composed of a pseudo random number series code is assigned to each of communication lines in a transmitting side. The assigned PN code is multiplied by a primary modulation signal of the same carrier frequency, so that the PN code is spread to a band wider than an original frequency band (this is called a spectrum diffusion hereinafter) and a secondary modulation signal subjected to the spectrum diffusion is transmitted.

On the other hand, a receiving side, receiving a transmitted signal sent from the transmitting side, multiplies the received signal by the PN code having the same series pattern and the same phase as those of the PN code assigned to each of the communication lines in the transmitting side, so that the received signal is subjected to an inverse diffusion process to obtain a primary modulation output. In addition, the primary modulation output is demodulated so as to restore transmitted data.

As described above, according to the CDMA system, the same PN code is previously set to be mutually generated in the transmitting side and the receiving side. In the receiving side, only when the inverse diffusion process is carried out by using the PN code having the same series pattern and the same phase as those of the PN code used in the transmitting side, the primary modulation output can be demodulated, and therefore, an excellent secrecy can be advantageously achieved.

Further, in a cellular radio communication system utilizing the CDMA system, the base station of the transmitting side repeatedly transmits pilot signals generated by diffusing data comprising all "1" or "0" with the PN code in order to get a synchronization, to track a synchronization (tracking) and to reproduce a clock in a mobile station side. The mobile station of the receiving side first receives the pilot signals constantly sent from the base stations at the time of turning power on.

The mobile station of the receiving side receives a plurality of pilot signals transmitted in a multipass through a plurality of transmission paths in a superposed state to obtain receiving timings different from each other for the respective pilot signals. Then, when an actual talking is started, the mobile station multiplies the received signals in the multipass (referred as multipass signals, hereinafter) which are received in a delayed state with a plurality of demodulators provided therein by the respective PN codes having the phases corresponding to the obtained receiving timings in order to perform an inverse diffusion process. A combiner combines the plurality of inverse-spread received signals in a state in which their timings are set to the same timing. Thus, a signal-to-noise power ratio (SN ratio) of the demodulation signal is improved. That is, the mobile station is designed to constitute a Rake receiver which prevents direct waves in a multipass and reflection waves from interfering with each other so as to lower electric power.

For instance, in the CDMA system which has been already standardized in U.S.A. as an IS-95 system, as illustrated in FIG. 1, a mobile station 1 of the receiving side receives pilot signals P1 to P3 in a multipass which are sent from an object base station 2 with a time delay due to the reflection of buildings 3 and 4. Here, the pilot signals P1 to P3, which are received by the mobile station 1, have the same series pattern, however, have different phase shifts due to the time delay.

The mobile station 1 calculates the correlation values of the pilot signals P1 to P3 and the respective PN codes generated therein with a circuit called a searcher (not shown) provided therein while moving phases of the PN codes, so that the phases of the pilot signals P1 to P3 are detected. Then, the mobile station 1 synchronizes them with a system clock cn to all the base station and mobile stations in a whole system with the pilot signal P1 having the largest correlation value as a reference. Thus, the pilot signals P1 to P3 are composed of the PN codes whose cycles have the same series pattern of 32768 series ($2^{15}$), and they have a common position of a phase "0" and the phases of the pilot signals are shifted respectively by several tens of chips.

In the pilot signals P1 to P3, the direct wave is the largest correlation value. As the arrival time of the reflection wave is late, the correlation value of the reflection wave becomes smaller than that of the direct wave. This is associated with the phase shift representing the difference of arrival time among the pilot signals P1 to P3 which reach the mobile station. As a matter of course, the pilot signal P1 being the direct wave, which has the largest correlation value, has the smallest phase.

When the mobile station starts an actual talking after exchanging control data including such pilot signals P1 to P3 with the base station, it initially detects received signals (multipass signals) S1, S2 and S3 in a multipass state by calculating the correlation values with a searcher, as shown in FIG. 2.

Then, when the mobile station detects the multipass signals S1 to S3, the multipass signal S1 having the largest correlation value among them is used as a reference signal. The mobile station periodically detects (referred to as a steady search, hereinafter) with the searcher whether or not the multipass signals S1 to S3 exist within an arbitrary search window range called a "search window" having the phase position 64 of the reference signal at a center which is designated by the base station. When the mobile station can detect the multipass signals S1 to S3, it demodulates transmitted data by employing the multipass signals S1 to S3 (phase positions 64, 68 and 70) which are the three highest signal strength.

Here, the "search window" is determined to range between ±20 of the multipass signal S1 serving as the reference signal S1 (from 44 to 84 in the phase position). The mobile station always carries out the steady search within the above-described search window range even during receiving of real data.

Since it is generally difficult to consider that there exists an extremely big time difference between the multipass signal S1 at the phase position 64 which arrives at the mobile station first, and the multipass signals S2 and S3 which arrive with a delay due to the reflection of buildings, in this case, a search window range is determined so as to detect the multipass signals S1 to S3, which are the three highest signal strength, by searching the phase range between ±20 of the multipass signal S1 at the phase position 64, which arrives first and is served as the center.

As described above, according to the CDMA system of the IS-95 system, the multipass signal S1 at the phase position 64, which arrives at the mobile station first, is used as the reference signal, and the time management such as the acquisition of synchronization, the tracking of synchronization, the reproduction of clocks, etc. is performed based on the reference signal.

However, in the case where the reference signal on lost due to the change of a transmission condition, the mobile station quickly uses the multipass signal S2 at the phase position 68, which arrives at the mobile station next, as a reference signal in accordance with a prescribed time constant in order to perform time management.

In order to perform such time management, the mobile station uses a counter (called a system time counter, hereinafter) on which the time management is based. This system time counter always follows a reference signal. It the reference signal is lost due to the change of a transmission condition, as a matter of course, the system time counter follows a next reference signal to carry out the time management.

With the mobile station having the above-described constitution, when the above-mentioned time management is performed, the system time counter, on which the time management is based, always follows a reference signal. Under a severe communication environment such as fading, however, as shown in FIG. 3, assuming that a search window ranges from 44 to 84 in the phase and noise E whose correlation value reaches a prescribed level or higher exists at a phase position 45 in the end part of the "search window", the mobile station erroneously detects the noise E, which has the smallest phase, as a reference signal.

In this case, since the search window range for the steady search to be performed next by the mobile station is changed to a search window range between ±20 of the phase position 45 of a "false reference signal" positioned at the center as shown in FIG. 4, the multipass signals S2 and S3 at the phase positions 68 and 70 cannot be detected and only the multipass signal S1 located at the phase position 64 can be detected.

However, under an actual fading environment, the multipass signal S1 can not be often detected because of its signal strength falling by 30 dB or more. If this phenomenon occurs during the steady search, in the worst case, the multipass signal S1 to be naturally received cannot be disadvantageously detected again, so that the reference signal has lost.

Further, the noise E which is accidentally erroneously detected is detected again with an extremely low probability during a next steady search, so that the reference signal, on which the time management depends, is completely lost. In this instance, as illustrated in FIG. 5, the search window actually begins to shift gently either forward or backward by the clock error of the system time counter, which is employed by the base station and the mobile station, with the phase position 45 as the center, and the steady search is performed within the then shifted phase range.

If the shift direction is a direction illustrated by an arrow mark, the search window range further shifts from the phase range of ±20 of the phase position 45 of the "false reference signal" positioned at the center toward a direction in which the multipass signals S1 to S3 cannot be detected. Therefore, also in this case, the multipass signal S1 cannot be detected again and thus, the reference signal has lost.

SUMMARY OF THE INVENTION

In view of the foregoing, and object of this invention is to provide a receiving method and receiver for spread spectrum signals in which delay timings of delay signals received through a plurality of transmission paths are detected in a short time and the delay signals are accurately demodulated.

The foregoing object and other objects of the invention have been achieved by the provision of a receiving method for spread spectrum signals, in which the spread spectrum signals transmitted by spectrum-diffusing a modulation signal are received through a plurality of transmission paths as a plurality of spread spectrum signals, the plurality of spread spectrum signals are inverse-spectrum-spread by using diffusion codes having different phases respectively corresponding to the receiving timings of the plurality of spread spectrum signals and synthesized while setting their timings the same in order to generate a demodulation signal. In addition, receiving timing of a spread spectrum signal having the largest correlation value, out of the received plurality of spread spectrum signals, is used as a reference phase position to decide a predetermined detection phase range. Then, the spread spectrum signals of which correlation values with the respective diffusion codes is a predetermined level or higher are detected within the predetermined detection phase range, in order to generate a demodulation signal from the spread spectrum signals, of which the correlation values with the respective diffusion codes are the predetermined level or higher. Afterwards, the steps of setting the predetermined detection phase range, detecting the spread spectrum signals, and generating a demodulation signal are repeated. If the spread spectrum signals, of which the correlation values with the respective diffusion codes are the predetermined level or higher, are not detected within the predetermined detection phase range, the detection phase range is widen based on the reference phase position. Therefore, even the case where noises or the like cause movement of the detection phase range and a plurality of delay signals to be originally detected are lost, the delay timings can be simply detected only by searching the predetermined detection phase range further widen. Thus, a plurality of delay signals are demodulated according to the respective delay timings.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Whole Constitution of Rake Receiver

Figure 1:
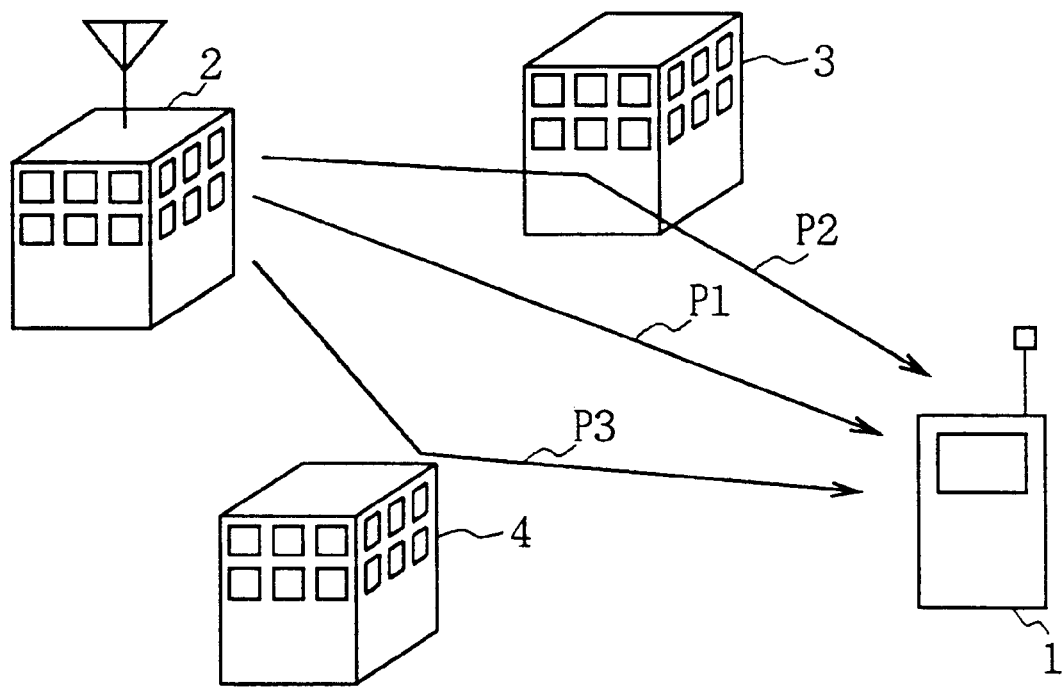
FIG. 1 is a schematic diagram explaining a multipass.
Figure 2:
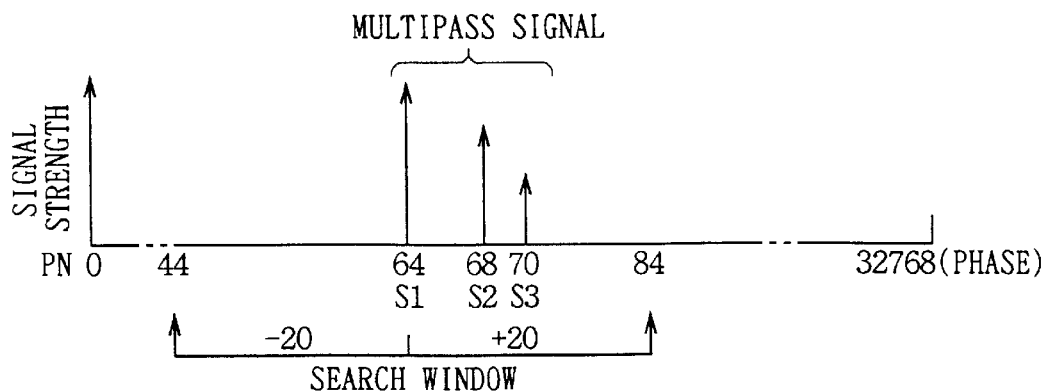
FIG. 2 is a schematic diagram showing a search window range.
Figure 3:
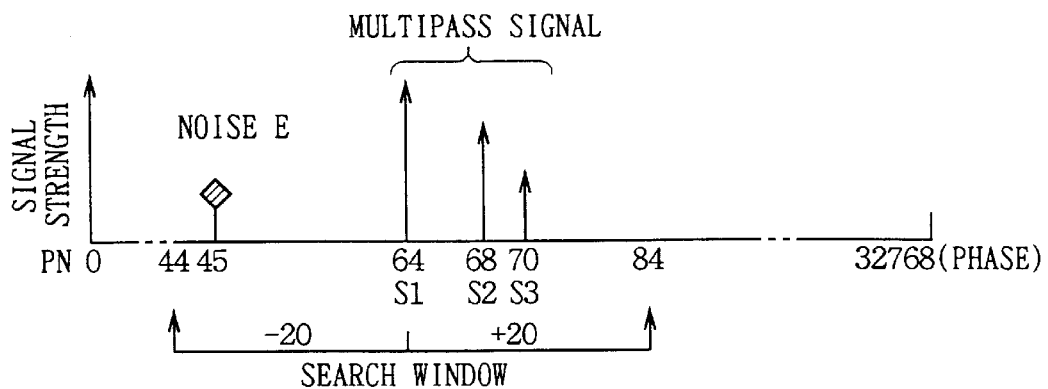
FIG. 3 is a schematic diagram showing a search window range in the case where noise is erroneously detected.
Figure 4:
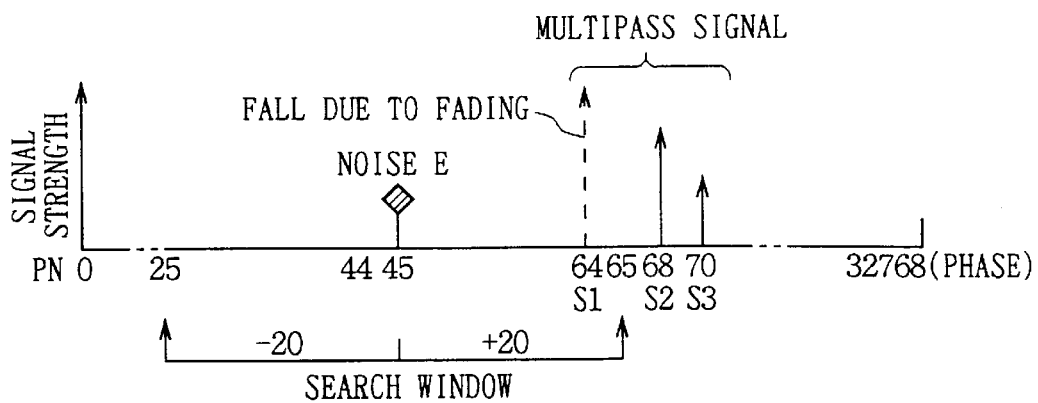
FIG. 4 is a schematic diagram showing a search window range determined with the noise at a center.
Figure 5:
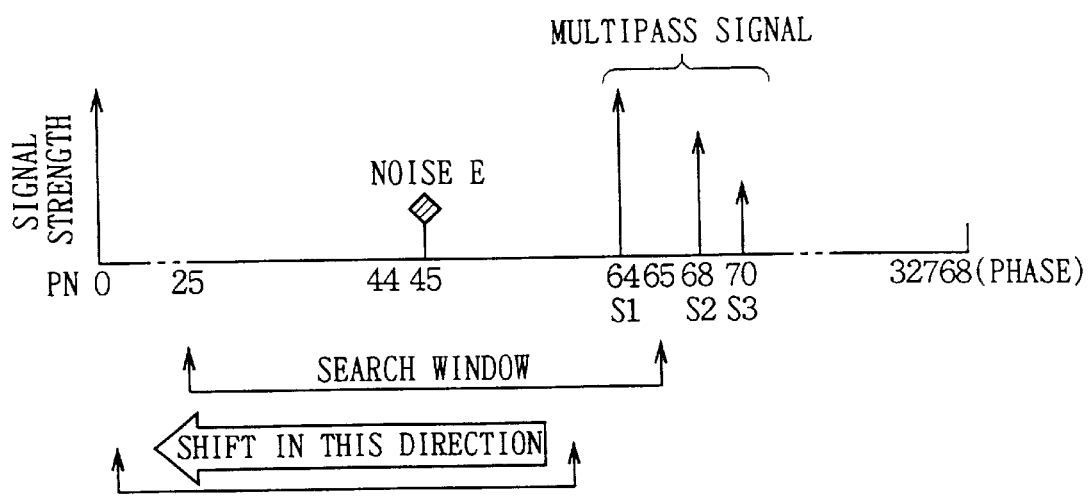
FIG. 5 is a schematic diagram showing the shift of a search window.
Figure 6:
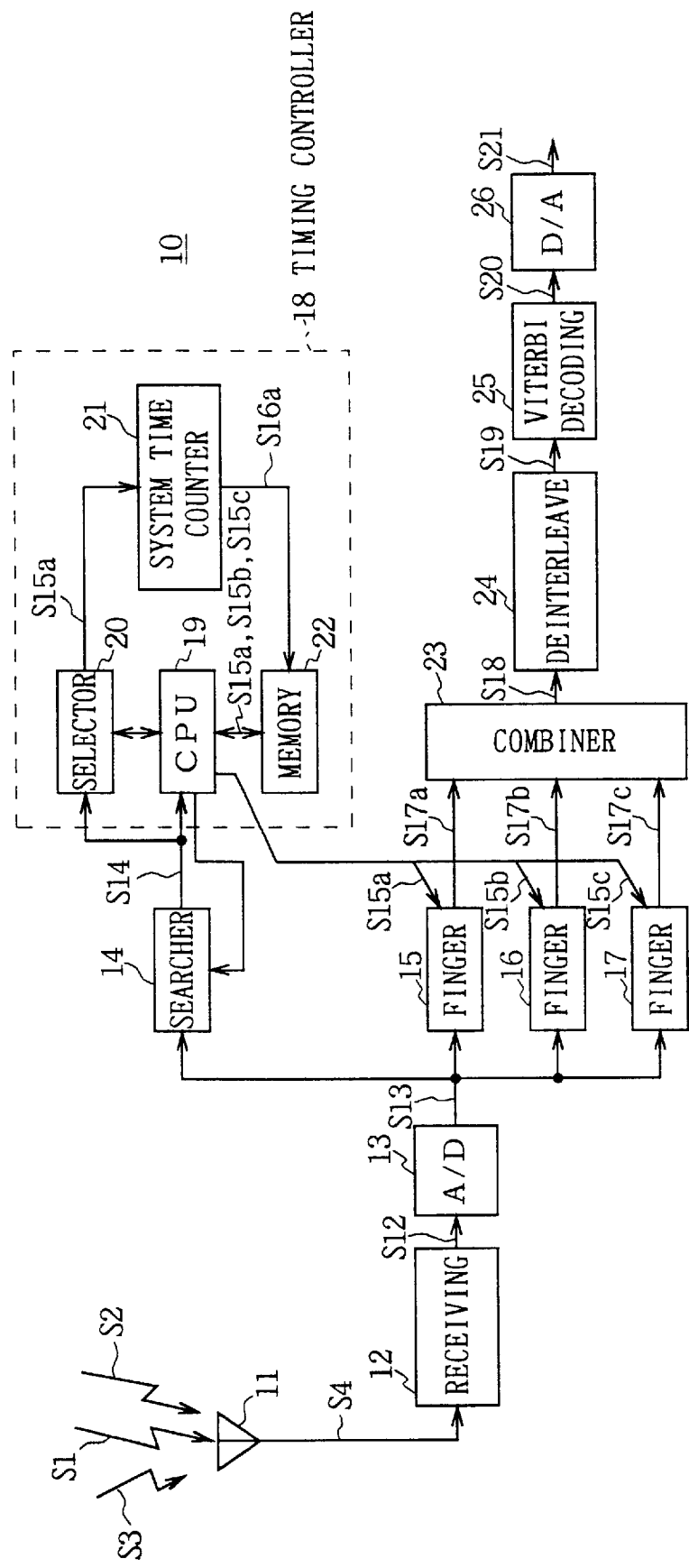
FIG. 6 is a block diagram showing the constitution of a Rake receiver according to one embodiment of the present invention.

As shown in FIG. 6, 10 generally designates a Rake receiver as a receiver according to the present invention which is mounted on a mobile station and is designed to reduce the influence of fading due to a multipass and to improve an SN ratio. This receiver initially receives, upon start of talking, multipass signals S1 to S3 arriving through a plurality of transmission paths via an antenna 11 and inputs them to a receiving circuit 12 as received signals S4.

The receiving circuit 12 applies a frequency conversion process to the received signals S4 to take out and send baseband signals S12 to an analog/digital conversion circuit 13. The analog/digital conversion circuit 13 applies an analog/digital conversion process to baseband signals S12 to generate and send a receiving symbol stream S13 to a searcher 14 and fingers 15 to 17.

The searcher 14 generates a PN code having the same series pattern as that used when the inputted receiving symbol stream S13 is subjected to a spectrum diffusion process in a transmitting side, and multiplies the PN code by the receiving symbol stream S13 while shifting the phase of the PN code, so that it calculates a correlation value every phase. Then, the searcher 14 sends a PN code S14 represented by the correlation values every phase to the central processing unit (CPU) 19 and the selector 20 of a timing controller 18.

The CPU 19 detects PN codes S15a, S15b and S15c whose correlation values exceed a prescribed level and which are the three highest signal strength and are shown in a phase position, among the PN codes S14 for respective phases, and then stores them in a memory 22. Further, the CPU 19 outputs a control signal to the selector 20 so as to output the PN code S15a whose correlation value exceeds the prescribed level and whose phase is the smallest to a system time counter 21 from among the PN codes S14 stored in the selector 20.

Here, the system time counter 21 follows the PN code S15a, which has the smallest phase, to synchronize it with a system clock common to the whole of a system and provides a reference time. A count value corresponding to the phase position of the PN code S15a, which synchronizes with the reference time, is stored in the memory 22 as count information S16a.

The CPU 19 reads out the PN codes S15a, S15b and S15c from the memory 22 and supplies the PN code S15a to the finger 15, the PN code 15b to the finger 16 and the PN code 15c to the finger 17.

The fingers 15 to 17 are composed of demodulators. The finger 15 multiplies the receiving symbol stream S13 by the PN code S15a in synchronization with the timing at which the receiving symbol stream S13 is inputted, so that it applies an inverse diffusion process to the signal component of the multipass signal S1. The finger 15 transmits a coding bit series S17a to a combiner 23.

The finger 16 similarly multiplies the receiving symbol stream S13 by the PN code S15b in synchronization with the timing at which the receiving symbol stream S13 is inputted, so that it applies the inverse diffusion process to the signal component of the multipass signal S2. The finger 16 transmits a coding bit series S17b to the combiner 23.

Further, the finger 17 also multiplies the receiving symbol stream S13 by the PN code S15c in synchronization with the timing at which the receiving symbol stream S13 is inputted, so that it applies the inverse diffusion process to the signal component of the multipass signal S3. The finger 17 transmits the coding bit series S17c to the combiner 23.

The combiner 23 combines the coding bit series S17a, the coding bit series S17b and the coding bit series S17c in a state of setting their phase timings to the same with a reference time as a reference, so that a coding bit series S18 with an SN ratio improved is generated and is transmitted to a deinterleave circuit 24.

The deinterleave circuit 24 rearranges the sequence of the coding bit series S18 in accordance with a procedure reverse to an interleave process carried out by the transmitting side to perform a deinterleave process, so that the sequence is returned to an original sequence. The deinterleave circuit 24 transmits the resultant coding bit series S19 to a viterbi decoding circuit 25.

The viterbi decoding circuit 25 comprises a soft decision viterbi decoding circuit, which considers the trellis of a convolution code based on the inputted coding bit series S19 and estimates a most probable state among all state transitions which can be acquired as data (that is, a most likely series estimation), so that it restores and transmits an information bit series S20 to a digital/analog conversion circuit 26. The digital/analog conversion circuit 26 expands the inputted information bit series S20 and then converts the expanded information bit series S20 into an analog signal, so that it restores and outputs transmitted data S21.

The timing controller 18 determines the multipass signal S1 spreaded and modulated by the PN code S15a having the smallest phase among the PN codes S14 first detected by the searcher 14 as the reference signal of a reference, and determines a search window range with its phase position as the center.

Accordingly, when the timing controller 18 detects the multipass signals S1 to S3 by a steady search performed next, the timing controller 18 determines the multipass signal S1 as the reference signal to move the search window range with its phase position as the center, so that the phase position of the reference signal moves whenever the multipass signals S1 to S3 are detected by the steady search, and the search window range is also moved together therewith.

Therefore, in the case the search window range moves based on a "false reference signal" erroneously detected due to noise or the like, the timing controller 18 cannot possibly detect proper multipass signals S1 to S3. In the timing controller 18, however, even when the search window range moves based on the "false reference signal" due to the noise, etc, the CPU 19 controls the search window range for the steady search carried out by the searcher 14 so as to assuredly detect a proper reference signal and acquire a synchronization.

In practice, once the searcher 14 detects the multipass signals S1 to S3, the CPU 19 of the timing controller 18 determines the multipass signal S1 as a reference signal. The CPU 19 has an internal counter for counting the number of times N when the multipass signals S1 to S3 cannot be detected by the steady search performed within the search window range having the phase position of the reference signal at the center. When the reference signal cannot be detected although the steady search is carried out prescribed number of times M or more, the CPU 19 decides that the reference signal has been lost and widens the search window range for conducting a steady search in accordance with a prescribed method. Next, three types of search window range control methods 1,2 and 3 of widening the search window range will be specifically described below.

(2) Search Window Range Control Method 1

Figure 7:
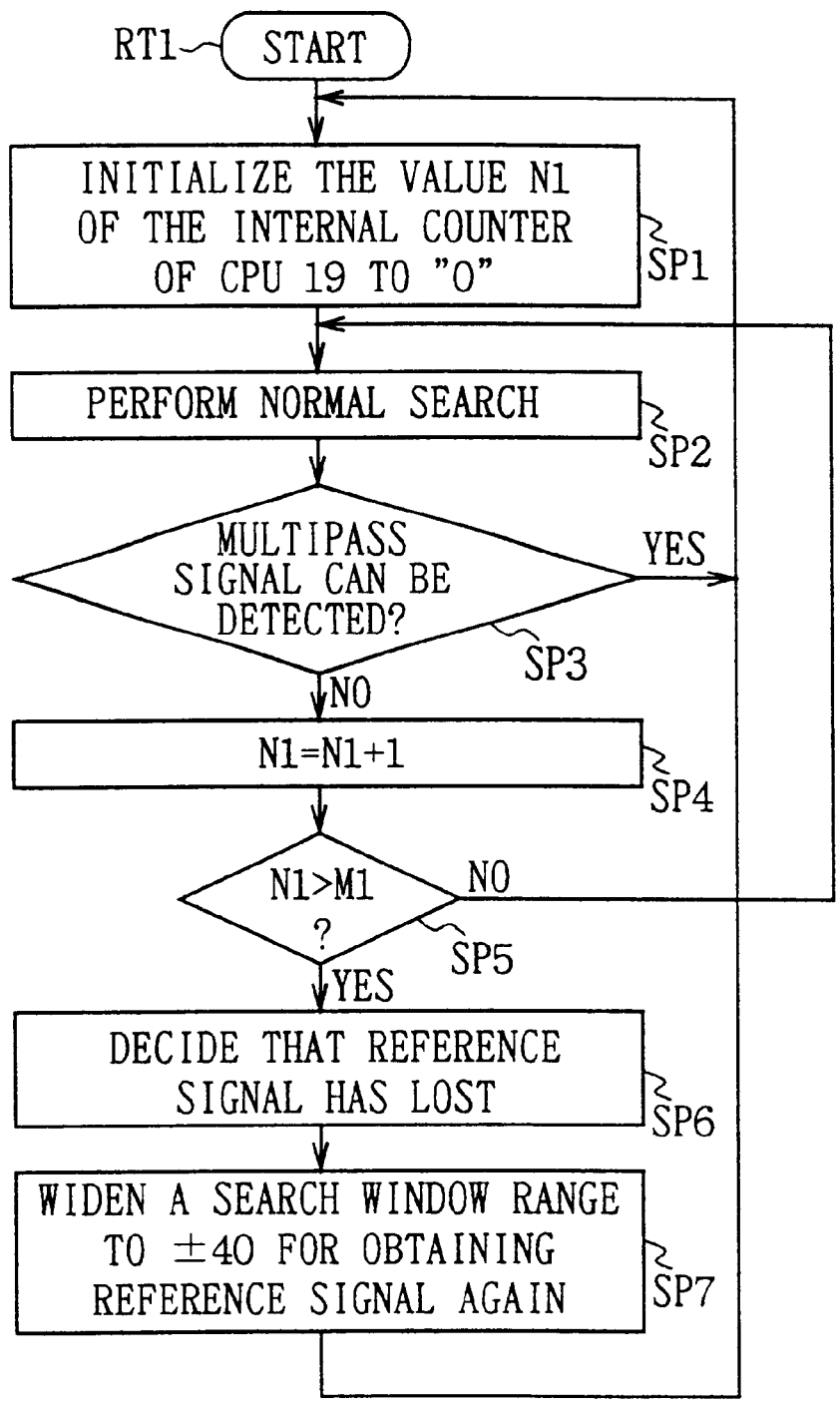
FIG. 7 is a flowchart showing the procedure of a search window range control method 1 according to a first embodiment of the present invention.
Figure 8:
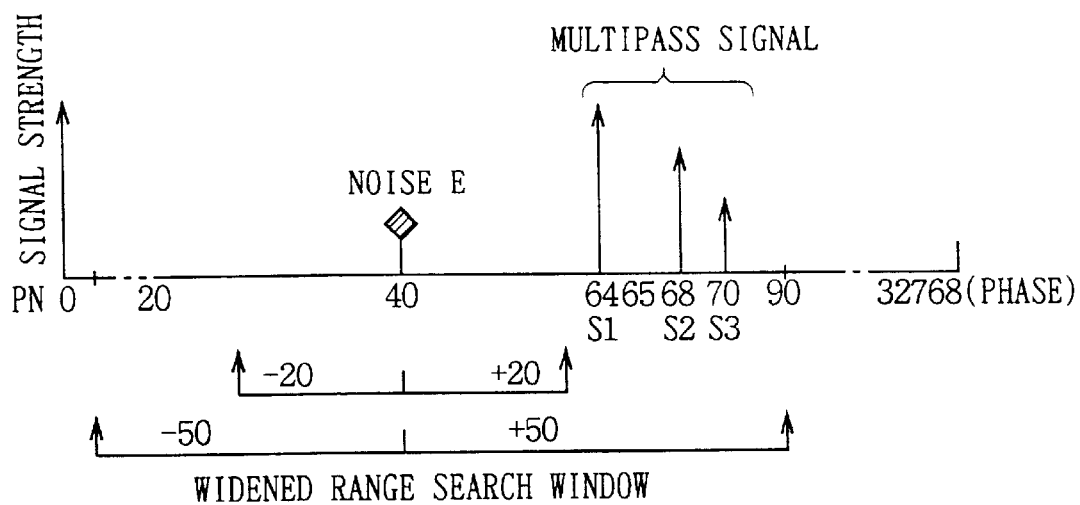
FIG. 8 is a schematic diagram showing a new search window range widened in accordance with the search window range control method 1 according to the first embodiment of the present invention.

As shown in FIG. 7, in the Rake receiver 10, a procedure primarily begins from start step RT1 and moves to step SP1. In the step SP1, the CPU 19 initializes the count value N1 of the internal counter for counting the number of times of performing the steady search to "0" and proceeds to next step SP2.

In the step SP2, the CPU 19 determines the multipass signal S1 having the smallest phase among the multipass signals S1 to S3 detected by the searcher 14 at the time of starting a receiving operation as a reference signal, carries out a steady search within a search window range having its phase position at the center and moves to next step SP3. In the step SP3, the CPU 19 decides whether or not the multipass signals S1 to S3 are detected by the searcher 14 after the start of the receiving operation.

An affirmative result in the step 3 means that the PN codes S15$a$, S15$b$ and S15$c$ whose correlation values exceed a prescribed level and which are the three highest signal strength and represented in a phase position are detected from among the PN codes S14 for respective phases, that is to say, that the multipass signals S1 to S3 are detected. At this time, the CPU 19 returns again to the step SP1 to repeat the above-mentioned processes.

Then, after the CPU 19 detects the multipass signals S1 to S3 once, it repeats the steady search process of the steps SP1 and SP2. A negative result in the step SP3 means that the PN codes S15$a$, S15$b$ and S15$c$ whose correlation values exceed a prescribed level and which are the three highest signal strength and represented in the phase position are not detected from among the PN codes S14 for respective phases, in other words, that the multipass signals S1 to S3 are not detected. At this time, the CPU 19 moves to next step SP4.

In the step SP4, since the multipass signals S1 to S3 are not detected, the CPU 19 gives an increment of "1" to the count value N1 of the internal counter and moves to subsequent step SP5. In the step SP5, the CPU 19 decides whether or not the count value N1 of the internal counter exceeds a prescribed value M1.

A negative result here means that the count value N1 of the internal counter does not exceed the prescribed value M1. In this case, the CPU 19 returns to the step SP2 to repeat the steady search. On the contrary, an affirmative result in the step SP5 means that the count value N1 of the internal counter exceeds the prescribed value M1. In this case, the CPU 19 proceeds to next step SP6.

In the step SP6, the CPU 19 decides that, since the multipass signals S1 to S3 cannot be detected although the steady search was carried out prescribed number of times or more after the multipass signals S1 to S3 are detected, the reference signal has lost because the search window range moves owing to an erroneous detection due to noise or the like. Then, the CPU 19 moves to next step SP7.

In the step SP7, the CPU 19 widens, in order to obtain again a reference signal, the search window range with the phase position 40 of noise E, which erroneously detected in the last steady search, as a reference signal, from a phase range of ±20 to an arbitrary phase range of ±50. Then, the CPU 19 returns to the step SP1 to repeat the above-mentioned processes.

As described above, in the case where the CPU 19 decides that the reference signal has lost by an erroneous detection due to noise, etc. after detecting the multipass signals S1 to S3 once, the timing controller 18 further widens the search window range more than before with the phase position of the reference signal lost as its center in order to search the widened search window range. Thereby, the controller 18 can search a range which cannot be detected hitherto. Thus, the multipass signals S1 to S3 can be detected and demodulated by accurately obtaining again a synchronization therewith.

(3) Search Window Range Control Method 2

Figure 9:
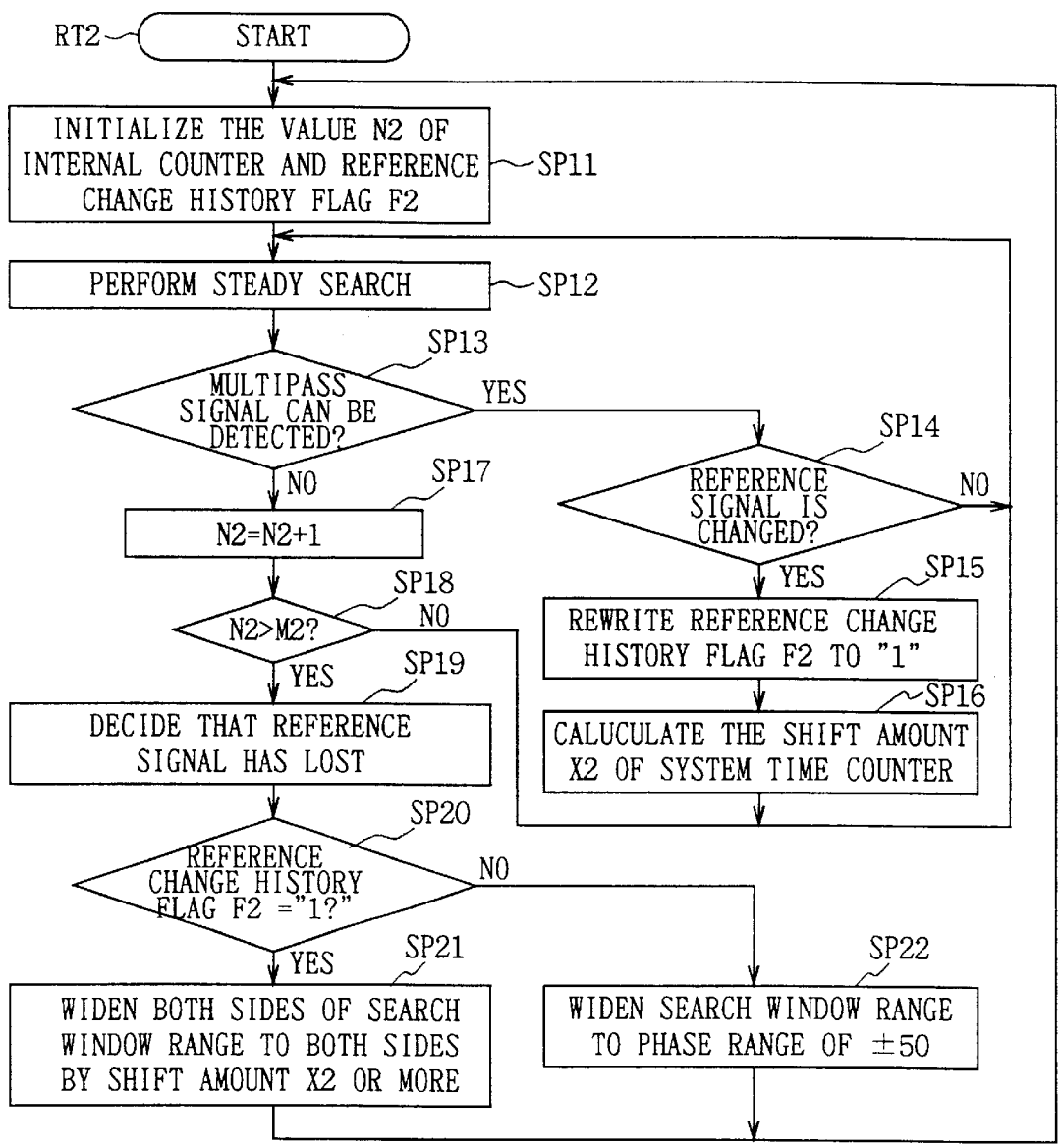
FIG. 9 is a flowchart showing the procedure of a search window range control method 2 according to a second embodiment of the present invention.

Further, as illustrated in FIG. 9, in the Rake receiver 10, a procedure enters from the start step RT2 and moves to step SP11. In the step SP11, the CPU 19 initializes the count value N2 of the internal counter and a reference change history flag F2 to be written in the memory 22 when a reference signal is changed as a result of the a steady search, to "0" and then, proceeds to next step SP12.

Figure 10:
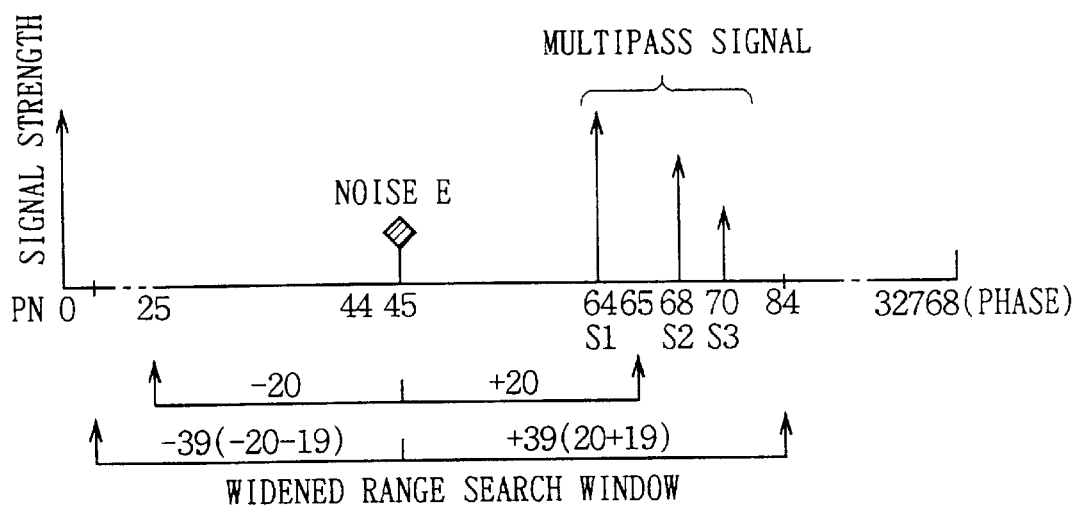
FIG. 10 is a schematic diagram showing a new search window range widen in accordance with the search window range control method 2 according to the second embodiment of the present invention.

In the step SP12, the CPU 19 determines the multipass signal S1 whose phase is the smallest among the multipass signals S1 to S3 detected by the searcher 14 as a reference signal as shown in FIG. 10, and carries out the steady search within the search window range (±20) having the phase position 64 of the reference signal at the center. Then the CPU 19 proceeds to next step SP13. In the step SP13, the CPU 19 decides whether or not the multipass signals S1 to S3 are detected or not by the steady search.

An affirmative result here means that the PN codes S15$a$, S15$b$ and S15$c$ whose correlation values exceed a prescribed level and which are the three highest signal strength and represented in the phase position are detected from among the PN codes S14 for respective phases, that is to say, that the multipass signals S1 to S3 are detected. At this time, the CPU 19 moves to next step SP14.

In the step SP14, the CPU 19 decides whether or not a reference signal is changed in the next steady search by the searcher 14 because the multipass signals S1 to S3 are detected. In this instance, when noise E (phase position 45) which is detected by mistake due to noise is included in the detected multipass signals, the search window range for the next steady search is changed to a search window range having the phase position 45 of a "false reference signal" at its center.

In this case, an affirmative result is obtained. This means that the reference signal is changed. In this case, the CPU 19 proceeds to step SP15. Because the reference signal is changed, in step SP15, the CPU 19 rewrites the reference change history flag F2, which is first initialized and written in the memory 22, from "0" to "1" and proceeds to next step SP16.

In the step SP16, the CPU 19, based on the two kinds of count values (phase position 64 and phase position 45) of the system time counter before and after the reference signal is changed, calculates a shift amount X2 (64−45=19) and stores the shift amount X2 (phase difference 19) in the memory 22. Then, the CPU 19 returns again to the step SP12.

Then, the CPU 19 executes again the steady searches after the step SP12. However, if the changed reference signal is a "false reference signal" due to the noise E, the multipass signals S1 to S3 cannot be detected. In this case, the negative result is obtained in the step SP13, and the CPU 19 moves to step SP17.

When the multipass signals S1 to S3 are not detected because the steady search is carried out based on the "false reference signal", in the step SP17, the CPU 19 performs an increment of "1" to the count value N2 of the internal counter and moves to next step SP18. In the step SP18, the CPU 19 decides whether or not the count value N2 of the internal counter exceeds a prescribed value M2.

A negative result here means that the count value N2 of the internal counter does not exceed the prescribed value M2. In this case, the CPU 19 returns to the step SP12 to repeat the steady search again. On the contrary, an affirmative result in the step SP15 means that the count value N2 of the internal counter exceeds the prescribed value M2. In this case, the CPU 19 moves to next step SP19.

The multipass signals S1 to S3 are detected once, however, the multipass signals S1 to S3 are not detected although the steady search is carried out prescribed number of times or more after that, so the CPU 19 decides in step SP19 that the reference signal has lost because the search window range moves owing to an erroneous detection due to noise E, and advances to next step SP20.

In the step SP20, the CPU 19 decides whether or not the reference change history flag F2 is rewritten to "1". Here, since the reference change history flag F2 has been previously rewritten to "1" in the step SP15, an affirmative result can be obtained. Then, the CPU 19 proceeds to step SP21.

The multipass signals have lost because the reference signal was changed to the "false reference signal". Therefore, in the step SP21 the CPU 19 adds the shift amount X2 (the phase difference 19) between the phase positions of the reference signals before and after change to the both sides of the search window range having the phase position 45 at its center. Thus, the search window range is widen to a new search window range (±39) having the phase position 45 at its center to carries out the steady search within the search window range, and then returns to the step SP11.

Consequently, the multipass signals S2 and S3 cannot be detected before widening the search window range. However, the search window range having the phase position 45 of the "false reference signal" at its center is widened by the shift amount X2 (phase interval 19) between the phase positions of the reference signals before and after change, so that the multipass signals S2 and S3 can be detected again when the steady search is performed.

As compared with the above, if a negative result is obtained in the step SP14, that is, if the reference signal is not changed, the CPU 19 returns to the step SP12 to carry out the steady search again.

Then, when the multipass signals S1 to S3 are not detected prescribed number of times or more under the steady search process after the step SP12, the CPU 19 determines that the reference signal has lost, and determines in step SP20 whether or not the reference change history flag F2 stored in the memory 22 has been rewritten from "0" to "1."

In this case, a negative result is obtained because the reference signal has not been previously changed in the step SP14. At this time, the CPU 19 moves to step SP22. In the step SP22, the CPU 19 arbitrarily widens the search window range to a phase range of ±50 from the phase position 64 of the multipass signal S1 at the center in order to detect the multipass signals S1 to S3 again and acquire a synchronization, and carries out the steady search. Then the CPU 19 returns to the step SP11.

(4) Search Window Range Control Method 3

Figure 11:
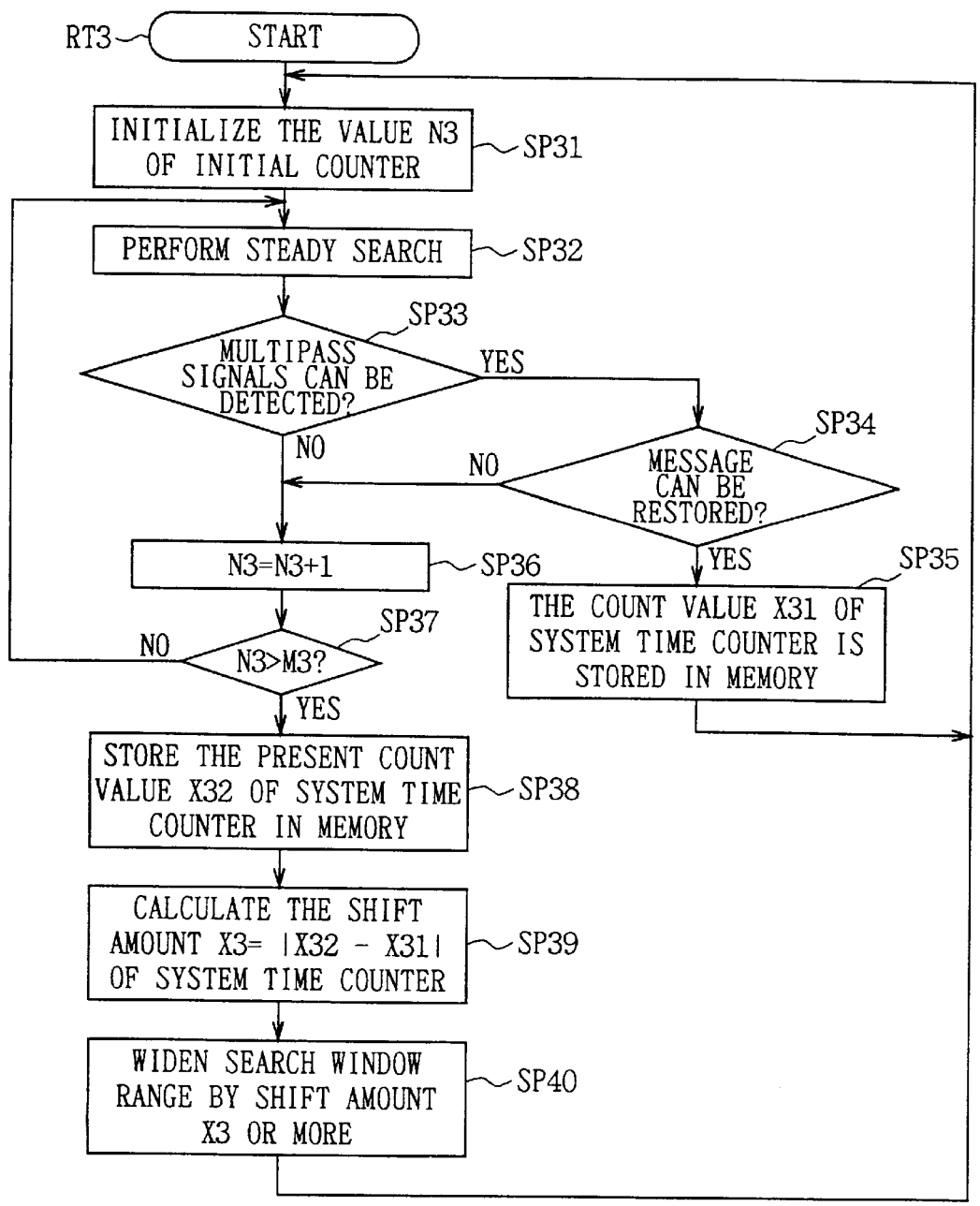
FIG. 11 is a flowchart showing the procedure of a search window range control method 3 according to a third embodiment of the present invention.

As shown in FIG. 11, in the Rake receiver 10, a procedure enters from the start step RT3 and moves to step SP31. In the step SP31, the CPU 19 initializes the count value N3 of the internal counter to "0" and proceeds to subsequent step SP32.

Figure 12:
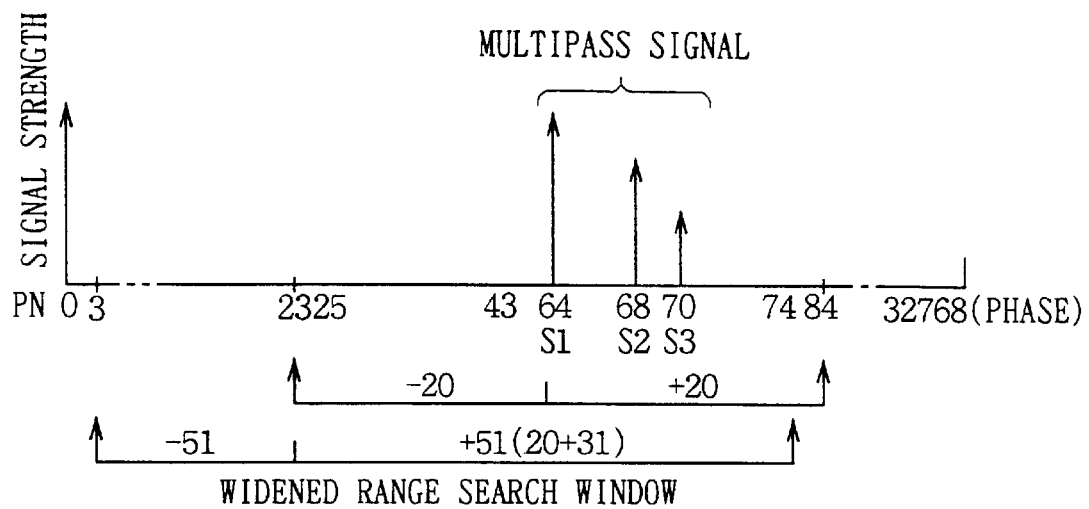
FIG. 12 is a schematic diagram showing a new search window range widened in accordance with the search window range control method 3 according to the third embodiment of the present invention.

In the step SP32, the CPU 19 determines the multipass signal S1, which has the smallest phase as shown in FIG. 12, as a reference signal among multipass signals S1 to S3 detected by the searcher 14, and carries out the steady search within a search window range having the phase position 64 of the reference signal at the center. Then, the CPU 19 advances to next step SP33.

In the step SP33, the CPU 19 decides whether or not the multipass signals S1 to S3 are detected by the searcher 14. An affirmative result here means that PN codes S15a, S15b and S15c whose correlation values exceed a prescribed level and which are the three highest signal strengthand represented in the phase position are detected among from PN codes S14 for respective phases, that is to say, that the multipass signals S1 are detected. At this time, the CPU 19 advances to next step SP34.

In the step SP34, the CPU 19 decides whether or not a message is restored based on the multipass signals S1 to S3. A negative result here means that the message cannot be restored, that is, that the multipass signal S1 is detected by mistake due to a noise E, and therefore the multipass signals S1 to S3 cannot be detected, so that data cannot be precisely restored. In this case, the CPU 19 moves to step SP36.

On the contrary, an affirmative result in the step SP34 means that the message can be restored based on the multipass signals S1 to S3. In this case, the CPU 19 stores the count value X31 of the system time counter indicating the phase position "64" of the reference signal in the memory 22 and returns to the step SP31.

If the CPU 19 executes the steady searches after the step SP31 and then obtains a negative result in the step SP33, that is, if the multipass signals S1 to S3 are not detected although the steady search has carried out after receiving the multiplass signals S1 to S3 and restoring message once, the CPU 19 proceeds to step SP36.

Since the multipass signals S1 to S3 are not detected, the CPU 19 performs an increment of "1" to the count value N3 of the internal counter in the step SP36 and moves to next step SP37. In the step SP37, the CPU 19 decides whether or not the count value N3 of the internal counter exceeds a prescribed value M3.

Here, if a negative result is obtained, that is, if the count value N3 of the internal counter does not exceed the prescribed value M3, the CPU 19 returns to the step SP32 to repeatedly carry out the steady search again. On the contrary, if an affirmative result is obtained in the step SP37, that is. If the count value N3 of the internal counter exceeds the prescribed value M3, the CPU 19 moves to next step SP38.

In the step SP38, the CPU 19 cannot perform the steady search precisely because the searcher 14 has lost the reference signal (see FIG. 12), thus stores the count value X32 of the system time counter 21 which indicates the phase position "23" locating at the then center of a search window range, in the memory 22 and advances to next step SP39.

In the step SP39, the CPU 19 calculates the shift amount X3 between the count value X31 and the count value X32 of the system time counter 21 and moves to next step SP40.

In the step SP40, the CPU 19 widens the present search window range (±20) to a range (±51) obtained by adding the shift amount X3 (phase difference 31) between the count value X31 (phase position 64) when the message can be restored and the count value X32 (phase position 23) when the reference signal was lost to the both sides of the present search window range (±20) to carry out the steady search, and then, returns to the step SP11.

Accordingly, the multipass signals S1 to S3 cannot be detected when the reference signal is lost, before the search window range is widened. However, the search window range is further widened by the shift amount X3 with the then count value X32 (phase position 23) of the reference signal as the center, so that the multipass signals S1 to S3 can be detected again.

With the Rake receiver 10 having the constitution mentioned above, when the multipass signals S1 to S3 are detected once by the searcher 14, the multipass signal S1 having the smallest phase among them is determined as a reference signal and the search window range determined by using the phase position of the reference signal as its center is used to perform the steady search. As a result, if the reference signal is lost because noise E or the like is erroneously detected as the multipass signal S1, the search window range is widened with the phase position of the reference signal thus lost as the center in accordance with a prescribed method. Consequently, the multipass signals S1 to S3 can be detected only by examining the search window range slightly wider than before.

Accordingly, in the Rake receiver 10, in the case where the detection of the multipass signals S1 to S3 is missed, it is not necessary to detect the multipass signals S1 to S3 by calculating all correlation values from the phase "0" of PN codes as in the conventional case, so that the multipass signals can be detected again in a short time. Thus, the Rake receiver 10 employs the multipass signal S1 having the smallest phase among newly detected multipass signals S1 to S3 as a reference signal, so that it can obtain accurately a synchronization and can thus restore data S21 transmitted.

According to the Rake receiver 10 with the above-mentioned constitution, when the reference signal is lost due to the erroneous detection caused by noise E during the steady search after the multipass signals S1 to S3 are detected once, the search window range is widened to a prescribed phase range by using the phase position of the missed reference signal as a reference, so that the multipass signals S1 to S3 can be detected within a wider search window range in a short time. Therefore, the data S21 transmitted after the accurate synchronization is attained can be accurately restored.

In the above-described embodiment, when the range is changed in accordance with the search window range control method 1, the search window range is widened by ±50 phases or more with the phase position 40 of the noise E as the center. However, the present invention is not limited thereto, but the search window range can be set to an arbitrary phase range by considering time required for search. In this case, the same effects as those of the above embodiment can be also achieved.

Further, according to the above embodiment, in the case where the range is changed in accordance with the search window range control methods 1, 2 and 3, the search window range is widen toward the both sides of the phase position with the reference signal as the center. However, the present invention is not limited thereto, but the search window range can be widened only toward one side in which the reference signal detected last exists.

Further, in the above-described embodiment, the present invention is applied to the case in which the multipass signals S1 to S3 are successively received during talking. However, the present invention is not limited thereto but the present invention can be applied to the case in which only the pilot signals P1 to P3 in a multipass state are intermittently received at prescribed time intervals.

Furthermore, in the above-described embodiment, the Rake receiver 10 serving as the receiver of the present invention comprises the antenna 11 and the receiving circuit 12 as receiving means, the searcher 14 and the timing controller 18 as delay detecting means, the fingers 15 to 17 as demodulating means and the searcher 14 and the timing controller 18 as detection range control means. However, the present invention is not limited thereto, but the receiver can be composed of various kinds of other receiving means, delay detection means, demodulating means and detection range control means.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A receiving method for spread spectrum signals includes receiving a plurality of spread spectrum signals transmitted by spectrum-diffusing a modulation signal through a plurality of transmission paths performing an inverse spectrum diffusion to said plurality of spread spectrum signals by using diffusion codes having different phases corresponding to respective receiving timings of the plurality of spread spectrum signals, and combining the inverse-spectrum-spread signals at a set timing to generate a demodulation signal, said receiving method for spread spectrum signals comprising the steps of:

setting a predetermined detection phase range with a receiving timing of a spread spectrum signal having a highest correlation value with a diffusion code out of said plurality of spread spectrum signals that are received as a reference phase position;

detecting said spread spectrum signals of which the correlation values with said diffusion codes are at least at a predetermined level out of said plurality of spread spectrum signals within said predetermined detection phase range;

generating a demodulation signal from said spread spectrum signals having correlation values that exceed said predetermined level;

repeating the steps of setting said predetermined detection phase range, detecting said spread spectrum signals, and generating said demodulation signal; and widening said predetermined detection phase range based on said reference phase position when said spread spectrum signals having the correlation values with said diffusion codes that exceed said predetermined level are not detected within said predetermined detection phase range.

2. The receiving method for spread spectrum signals according to claim 1, comprising the further step of defining said predetermined detection phase range to have both upper and lower limits having the same phase amount with said reference phase position at a center of the range.

3. The receiving method for spread spectrum signals according to claim 1, wherein when said spread spectrum signals are not detected within said predetermined detection phase range, said detection phase range is widened after repeating said step of detecting said spread spectrum signals within said predetermined detection phase range a predetermined number of times.

4. The receiving method for spread spectrum signals according to claim 2, comprising the further steps of:

determining that said reference phase position is changed and determining that said spread spectrum signals are not detected within said predetermined detection phase range, obtaining a phase difference between the reference phase position set at a start of receiving and a reference phase position set after obtaining the start of receiving in order to widen said detection phase range by adding at least said phase difference to the upper and lower limits of said reference phase position set after the start of receiving.

5. The receiving method for spread spectrum signals according to claim 1, comprising the further steps of:

defining said predetermined detection phase range set at the start of receiving to have both upper and lower limits having the same phase amount with said reference phase position at a center of the range, determining that said reference phase position is changed and determining that said spread spectrum signals are not detected within said predetermined detection phase range, and obtaining a phase difference between the reference phase position set at the start of receiving and a reference phase position set after the start of receiving in order to widen said detection phase range by adding at least said phase difference to a direction of said reference phase position set at the start of receiving.

6. A receiver for receiving a plurality of spread spectrum signals transmitted by spectrum diffusing a modulation signal through a plurality of transmission paths by performing an inverse spectrum diffusion to a said plurality of spread spectrum signals using diffusion codes having different phases corresponding to respective receiving timings of the plurality of spread spectrum signals, and combining the inverse-spectrum-spread signals at a set timing to generate a demodulation signal, said receiver comprising:

phase range setting means for setting a predetermined detection phase range with a receiving timing of a spread spectrum signal having a highest correlation value with a diffusion code out of said plurality of spread spectrum signals received as a reference phase position;

diffusion signal detecting means for detecting spread spectrum signals of which the correlation values with said diffusion codes are at least at a predetermined level out of said plurality of spread spectrum signals within said predetermined detection phase range;

demodulating means for generating a demodulation signal from said spread spectrum signals having correlation values that exceed said predetermined level; and phase range control means for widening said detection phase range based on said reference phase position when said spread spectrum signals having the correlation values with said diffusion codes that exceed said predetermined level are not detected within said predetermined detection phase range.

7. The receiver for spread spectrum signals according to claim 6, wherein said phase range setting means includes means for setting said predetermined detection phase range so as to have upper and lower limits of the same phase amount with said reference phase position at a center of the range.

8. The receiver for spread spectrum signals according to claim 6, wherein said diffusion signal detecting means includes means for repeating an operation of detecting said spread spectrum signals within said predetermined detection phase range a predetermined number of times, when said spread spectrum signals are not detected within said predetermined detection range, and said phase range control means includes means for widening said detection phase range.

9. The receiver for spread spectrum signals according to claim 6, wherein when said phase range setting means changes said reference phase position and said diffusion signal detecting means does not detect said spread spectrum signals within said predetermined detection phase range, said phase range control means includes means for obtaining a phase difference between a reference phase position set at the first time and a reference phase position set at the second time in order to widen said detection phase range by adding at least said phase difference to both upper and lower limits of said reference phase position set at the second time.

10. The receiver for spread spectrum signals according to claim 6, wherein said phase range setting means includes means for setting said predetermined detection phase range at the start of receiving so as to have both upper and lower limits of the same phase amount with said reference phase position at a center of the range, when said phase range setting means changes said reference phase position after the start of receiving and said diffusion signal detecting means does not detect said spread spectrum signals within said predetermined phase range, said phase range control means includes means for obtaining a phase difference between said reference phase position set at the start of receiving and said reference phase position set after the start of receiving in order to widen said detection phase range by adding at least said phase difference to the direction of said reference phase position set at the start of receiving.

* * * * *